United States Patent [19]
Hirata

[11] Patent Number: 4,615,569
[45] Date of Patent: Oct. 7, 1986

[54] LINEAR GUIDE APPARATUS

[75] Inventor: Jiro Hirata, Maebashi, Japan

[73] Assignee: Nippon Seiko Kabushiki Kaisha, Tokyo, Japan

[21] Appl. No.: 737,265

[22] Filed: May 23, 1985

[30] Foreign Application Priority Data

Jun. 12, 1984 [JP] Japan .................. 59-119135

[51] Int. Cl.$^4$ .......... F16C 29/06; F16C 29/00
[52] U.S. Cl. ........................ 384/45; 384/49
[58] Field of Search ......... 308/6 C, 3 R, 3 A, 6 R; 384/513, 516, 492

[56] References Cited

U.S. PATENT DOCUMENTS

| | | | |
|---|---|---|---|
| 2,620,163 | 12/1952 | Stone | 308/6 C X |
| 2,945,366 | 7/1960 | Sears | 308/6 C X |
| 3,800,558 | 4/1974 | Buthe et al. | 308/6 C X |
| 4,304,443 | 12/1981 | Hoffmann | 308/6 C |
| 4,478,462 | 10/1984 | Teramachi | 308/6 C |
| 4,512,616 | 4/1985 | Suzuki et al. | 308/3 R |

FOREIGN PATENT DOCUMENTS 2532661  1/1977  Fed. Rep. of Germany ...... 308/6 C

Primary Examiner—Stuart S. Levy
Assistant Examiner—Thomas R. Hannon
Attorney, Agent, or Firm—Shapiro and Shapiro

[57] ABSTRACT

In a linear guide apparatus including an elongated rail having a plurality of rolling member rolling grooves formed axially thereof, a saddle-like sliding member on the rail and provided with an axially extending recess having rolling member rolling grooves opposed to the rolling member rolling grooves of the rail, a number of rolling members rolling between the rolling member rolling grooves of the rail and the sliding member, a retainer for rollably retaining the rolling members, and end caps attached to the opposite ends of the sliding member and forming a circulation path for the rolling members, at least one of the rail and the sliding member is constituted by a base member made of a metal and extending in the form of a tube, and a filling member filling the hollow of the base member.

5 Claims, 6 Drawing Figures

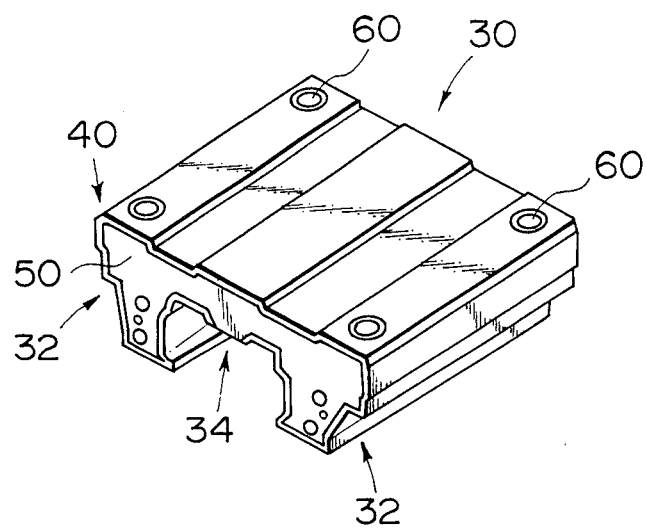
F I G. 3
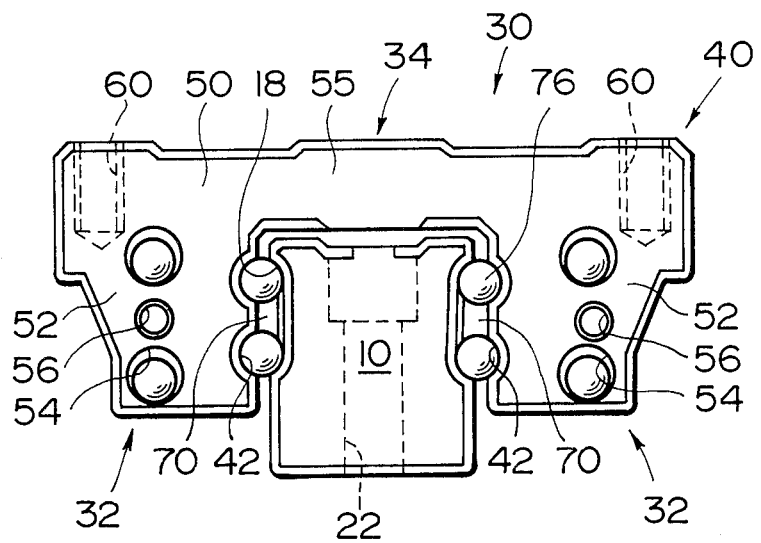
F I G. 4

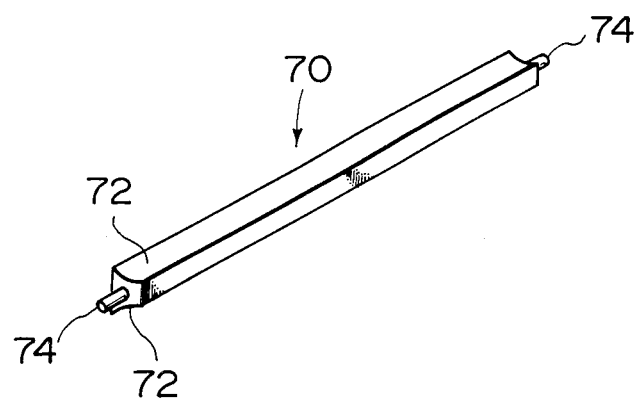
F I G. 5
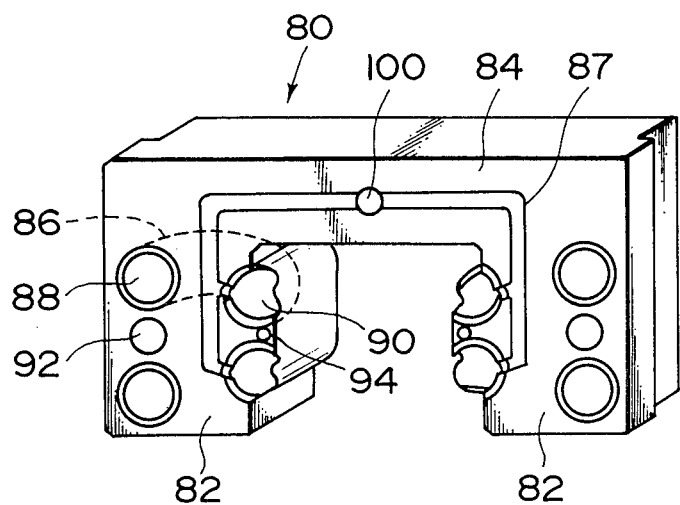
F I G. 6

LINEAR GUIDE APPARATUS

BACKGROUND OF THE INVENTION

1. Field of the Invention

This invention relates to improvements in a linear guide apparatus wherein a saddle-like sliding member slides on an elongated rail.

2. Description of the Prior Art

Known linear guide apparatus comprises an elongated rail having a plurality of rolling member rolling grooves formed axially thereof, a saddle-like sliding member on the rail and provided with an axially extending recess having rolling member rolling grooves opposed to the rolling member rolling grooves of the rail, and a number of rolling members rolling between the rolling member rolling grooves of said rail and the sliding member and circulated by circulating means formed in the sliding member.

Such linear guide apparatus utilizes a rolling guide mechanism and therefore, it can greatly decrease frictional resistance as compared with a conventional sliding guide apparatus utilizing a sliding guide mechanism. Also, it does not stick when it guides the movement of a moving body such as a table and it can accomplish precise guiding.

In recent years, it is not rare that the moving body is required to slide at a high speed and moreover at high accuracy, but the conventional rail and sliding member are usually made of hard steel and therefore, their ability to absorb vibration or shock applied to the moving body is not so great and thus, the accuracy of movement of the moving body may sometimes be reduced. Also, the conventional rail and sliding member have suffered from a disadvantage in that the shaping thereof requires much time and labor and they are heavy.

SUMMARY OF THE INVENTION

It is an object of the present invention to eliminate the above-noted disadvantages peculiar to the prior art and to provide a linear guide apparatus which is improved in attenuating vibration or shock and is easy to shape, as well as light in weight.

To achieve the above object, in the present invention, at least one of the rail and the sliding member is constituted by an outer frame-like base member formed by bending or drawing a metal plate (for example, a rigid plate), and a filling member (for example, epoxy concrete comprising media such as stone grains hardened by epoxy, synthetic resin or hard rubber) filling the hollow of the base member.

The base member has a certain degree of rigidity while, on the other hand, it is somewhat deformable in the direction of the plate thickness thereof due to its hollow shape. Also, it is desirable to use a material having an attenuating property as the filling member and, by being thus formed as a composite member of the base member and the filling member, the rail and/or the sliding member attenuates vibration.

BRIEF DESCRIPTION OF THE DRAWINGS

FIG. 3 is a perspective view of the sliding member.

FIG. 4 is a front view of the apparatus of FIG. 1 with end caps 80 removed therefrom.

FIG. 5 is a perspective view of a retainer.

FIG. 6 is a perspective view of an end cap 80.

DESCRIPTION OF THE PREFERRED EMBODIMENT

An embodiment of the present invention will hereinafter be described in detail with reference to the drawings.

Figure 1:
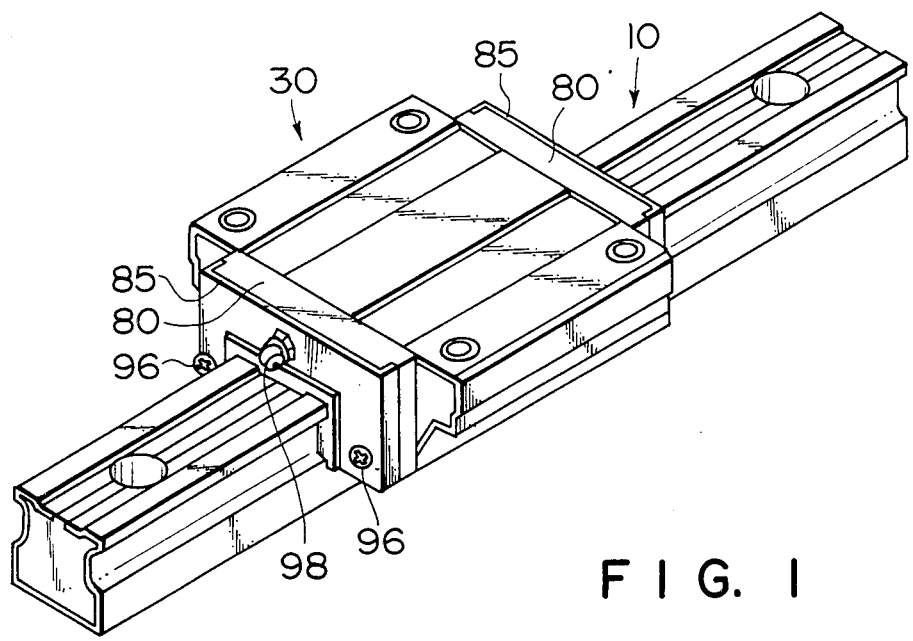
FIG. 1 is a perspective view showing an embodiment of the present invention.

As shown in FIG. 1, the linear guide apparatus includes an elongated rail 10, a saddle-like sliding member 30 put on the rail 10, a number of balls (not shown in FIG. 1) interposed between the rail 10 and the sliding member 30, end caps 80 attached to the opposite end surfaces of the sliding member 30 to form a circulation path for the balls, and seal plates 85 attached to the end caps.

Figure 2:
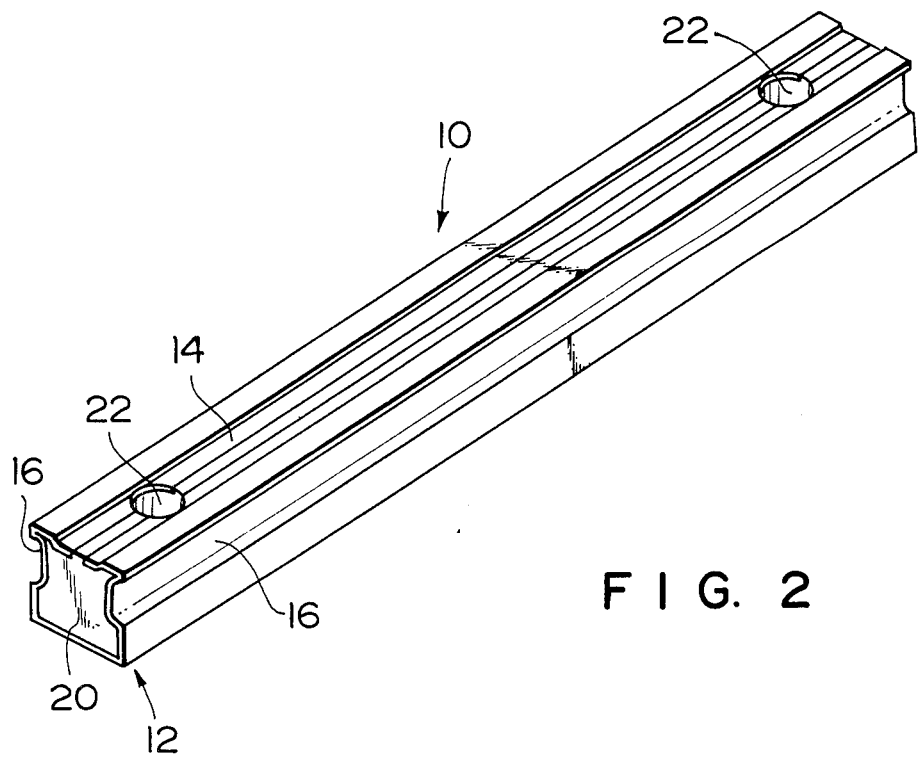
FIG. 2 is a perspective view of the rail.

As shown in FIGS. 2 and 4, the rail 10 comprises a base member 12 provided by bending a steel plate into the form of a square tube, and epoxy concrete 20 filling the hollow of the base member 12. The base member 12 has a shallow recess 14 in the upper surface thereof and has a deep recess 16 in each of the side surfaces thereof. The central portion of the recess 14 provides a seam or a slit and each recess 16 is hardened. The epoxy concrete 20 completely fills up the hollow of the base member 12. At each end portion of the rail 10, a bolt mounting hole 22 is formed from the recess 14 to the epoxy concrete 20.

As shown in FIGS. 3 and 4, the sliding member 30 comprises a base member 40 provided by bending a steel plate into an inverted concave shape and epoxy concrete 50 filling the hollow of the base member 40, and includes a pair of sleeve portions 32 and a connecting portion 34 which connects the sleeve portions. Two upper and lower arcuate ball rolling grooves 42 are formed in the inner side surface of each sleeve portion, and this portion of the base member 40 is hardened. The base member 40 is formed with a seam at the central portion of the underside of the connecting portion 34. Two upper and lower straight ball returning bores 54 are formed in the epoxy concrete 52 forming each sleeve portion 32, over the full length thereof, and bolt holes 56 for mounting end caps (FIG. 6) are formed between the bores 54. At the four corners of the upper surface of the sliding member 30, bolt mounting holes 60 are formed from the base member 40 to the epoxy concrete 50.

As is apparent from FIG. 4, a retainer 70 is attached to the inner side surface of each sleeve portion 32 of the sliding member 30. This retainer 70 is formed with an arcuate surface 72 over the full length of the upper and lower surfaces of an elongated bar-like member as shown in FIG. 5, and is held at a position shown in FIG. 4 by an end cap 80 which will be described below.

The end cap 80 is formed of synthetic resin and, as shown in FIG. 6, it includes a pair of sleeve portions 82 and a connecting portion 84 which connects the two sleeve portions, and has an inverted concave shape. Two upper and lower circular semidoughnut-shaped ball circulating holes 86 are formed in each sleeve portion 82, and the openings 88 of one of the ball circulating holes correspond to the ball returning bores 54 in the epoxy concrete 52 and the openings 90 of the other ball circulating hole correspond to the ball rolling grooves 42. These ball circulating holes 86 are formed by molding synthetic resin into the form of a semidoughnut-like pipe, but alternatively may be provided by the use of a pipe divided into two. A circular bore 92 is formed between the openings 88, and a small hole 94 is formed between the openings 90.

The small hole 94 is for inserting thereinto the small projection 74 of the end portion of said retainer 70, and the recesses 16 in the opposite side surfaces of the rail 10 are each divided into two by the retainer 70 and form ball rolling grooves 18 opposed to the ball rolling grooves 42 of the sliding member 30. A number of balls 76 are interposed between the ball rolling grooves 18 and 42. The end caps 80, after the circular bores 92 thereof are formed, are attached to the sliding member 30 by bolts 96 threadably engaged with the threaded holes 56 in the epoxy concrete 52. An oil supply nozzle 98 is attached to the connecting portion 84 of each end cap 80 by the utilization of a circular hole 100, and oil is supplied to each rolling surface via the circular hole 100 and through an oil groove 87.

The operation of the present embodiment will now be described.

The rail 10 is mounted on a base bed or the like by bolts threadably engaged with the bolt mounting holes 22, while the sliding member 30 is mounted on a table or the like by bolts threadably engaged with the bolt mounting holes 60. When the sliding member 30 slides axially on the rail 10, the sliding movement thereof is guided by the balls 76 rolling in the ball rolling grooves 18 and 42 and thus, the sliding member 30 slides smoothly and quietly. With the sliding movement of the sliding member 30, the balls 76 separate from the ball rolling grooves 18 and 42 and circulate (U-turn) in the ball circulating hole 86 in one of the end caps 80 and move in the straight ball circulating hole 54, whereafter the balls circulate in the ball circulating hole 86 in the other end cap 80 and return into the ball rolling grooves 18 and 42.

Where, for example, the sliding member 30 is mounted on the table of a machine tool during the use of the linear guide apparatus, vibration or shock may sometimes be applied to the sliding member 30 during operation of the tool. However, in the present embodiment, both of the rail 10 and the sliding member 30 comprise the base members 12 and 40 provided by bending hard steel and the epoxy concretes 20 and 50 as the filling members filling the hollows thereof and therefore, vibration or the like is attenuated more effectively than in a case where the rail and the sliding member are formed of solid hard steel as in the prior art.

Also, the base members 12 and 40 comprise steel plates, but epoxy concretes 20 and 50 fill the hollows thereof and therefore, the rigidity of the rail 10 and the sliding member 30 is sufficiently high and even when a heavy load is applied to the sliding member 30 or the sliding member slides at a high speed, the rigidity of the rail 10 and the sliding member 30 never becomes deficient. Further, the rail 10 and the sliding member 30 are light in weight and compact and yet can enhance the attenuating performance and maintain high rigidity.

The present invention should not be restricted to the above-described embodiment, but of course may be suitably changed or improved within the scope thereof. For example, the filling member filling the hollow of the base member of the rail and/or the sliding member is not limited to epoxy concrete, but may be synthetic resin or hard rubber. The material of the filling member is determined with the desired attenuating property and rigidity taken into account. Also, the shapes of the rail, the base members and the end caps, namely, the form of the linear guide apparatus, can of course be selected variously in accordance with the usage. Also, the portion of the base member 12, 40 which forms the ball rolling grooves may be polished after hardened or steel pipes may be inserted into the bolt mounting holes 22 of the rail 10, as required.

According to the present invention, as described above, the rail and/or the sliding member is made into a composite member and thus, the vibration or shock applied to the sliding member through the table or the like is attenuated by the rail and/or the sliding member and the sliding member slides highly accurately on the rail. Also, by selecting the material of the filling member filling the base members, the light weight of the apparatus can be achieved while the attenuating property and rigidity are maintained.

I claim:

1. A linear guide assembly including:
   an elongated rail having opposite side surfaces, each having at least one ball rolling groove extending axially;
   a slide member slidably mounted on the rail, the slide member comprising a hollow metal shell having a recess with inner side surfaces corresponding to the side surfaces of the rail, respectively, and plastic or elastomeric solid material filling a hollow space of the shell, each side surface of the hollow shell having at least one ball rolling groove extending axially and opposed to one of the ball rolling grooves of the rail, the solid material having a bore extending axially therethrough behind each ball rolling groove of the hollow shell;
   a plurality of balls disposed between the ball rolling grooves of the rail and of the slide member for enabling the slide member to slide along the rail;
   a pair of end caps each being attached to a respective end surface of the slide member and each having a pair of holes connecting ball rolling grooves of the rail and the slide member and a corresponding bore of the slide member, thereby forming ball circulation paths at each end of the slide member.

2. A linear guide assembly including:
   an elongated rail comprising a hollow metal shell having opposite side surfaces each having at least one ball rolling groove extending axially, and plastic or elastomeric solid material filling a hollow space of the shell;
   a slide member slidably mounted on the rail, the slide member comprising a hollow metal shell having a recess with inner side surfaces corresponding to the side surfaces of the rail, respectively, and plastic or elastomeric solid material filling a hollow space of the shell, each side surface of the hollow shell having at least one ball rolling groove extending axially and opposed to one or the ball rolling grooves of the rail, the solid material having a bore extending axially therethrough behind each ball rolling groove of the hollow shell;
   a plurality of balls disposed between the ball rolling grooves of the rail and of the slide member for enabling the slide member to slide along the rail;
   a pair of end caps each being attached to a respective end surface of the slide member and each having a pair of holes connecting the ball rolling grooves of the rail and the slide member and a corresponding bore of the slide member, thereby forming ball circulation paths at each end of the slide member.

3. A linear guide assembly according to claim 2, wherein the shell of the rail has a slit extending axially on an upper surface thereof, and the shell of the slide member has a slit extending axially on a surface connecting the side surfaces of the recess.

4. A linear guide assembly according to claim 3, wherein the rail has upper and lower ball rolling grooves at each of its side surfaces, and the slide member has upper and lower ball rolling grooves at each of its inner side surfaces, opposed to respective ball rolling grooves of the rail.

5. A linear guide assembly according to claim 4, wherein the solid material is epoxy concrete.

* * * * *